United States Patent
Post

(10) Patent No.: US 6,178,584 B1
(45) Date of Patent: Jan. 30, 2001

(54) VEHICLE WINDOW CLEANING APPARATUS

(75) Inventor: Kenneth P. Post, Lincoln Park, MI (US)

(73) Assignee: K & R Industries, Inc., Lincoln Park, MI (US)

(*) Notice: Under 35 U.S.C. 154(b), the term of this patent shall be extended for 0 days.

(21) Appl. No.: 09/104,957

(22) Filed: Jun. 25, 1998

(51) Int. Cl.[7] .................................................. A47L 1/06
(52) U.S. Cl. .......................... 15/220.1; 15/144.1; 15/232; 15/244.2; 403/316
(58) Field of Search ................................ 15/144.1, 144.2, 15/172, 220.1, 228, 231, 232, 244.2; 403/315, 316, 329

(56) References Cited

U.S. PATENT DOCUMENTS

| | | | |
|---|---|---|---|
| 1,084,184 | 1/1914 | Wenieke | 15/220.1 |
| 1,989,921 | * 2/1935 | Goddard | 15/231 X |
| 2,291,435 | 7/1942 | Anderson et al. | 15/220.1 |
| 2,301,586 | * 11/1942 | Rubin | 15/231 X |
| 2,304,127 | * 12/1942 | Stetson | 15/231 |
| 2,694,212 | 11/1954 | McGraw | 15/244.1 |
| 3,362,037 | * 1/1968 | Griffin | 15/144.1 X |
| 3,761,991 | * 10/1973 | Moss | 15/228 X |
| 4,503,579 | 3/1985 | Nicely | 15/244.2 |
| 4,926,522 | 5/1990 | Wang | 16/114 R |
| 5,003,659 | 4/1991 | Paepke | 15/229.13 |
| 5,012,544 | 5/1991 | Verry | 15/209.1 |
| 5,095,574 | 3/1992 | Khanzadian | 15/118 |
| 5,333,347 | 8/1994 | Stranders | 15/220.1 |
| 5,596,787 | 1/1997 | Steven et al. | 15/220.1 |
| 5,603,138 | 2/1997 | Bonis | 15/220.1 |
| 5,657,507 | 8/1997 | Wasak | 15/220.1 |

FOREIGN PATENT DOCUMENTS

| | | | |
|---|---|---|---|
| 1056318 | * 10/1953 | (FR) | 15/228 |
| 406211 | * 2/1934 | (GB) | 15/232 |

* cited by examiner

Primary Examiner—Mark Spisich
(74) Attorney, Agent, or Firm—Young & Basile, PC

(57) ABSTRACT

A window cleaning apparatus includes a handle, a paddle and a cleaning element. The paddle is detachable and pivotally attachable to the handle. A spring biased slider carried on the handle has a pivot pin on one end releasibly engagable with a hinge receiver on the paddle. The cleaning element is one of a plurality of interchangeable bodies, each having one major surface engagable with one major surface of a paddle and side edges having elastic mounted thereon to draw the ends of the side edges of the body inward to form an opening smaller than the outer diameter of the paddle to releasibly attach the body of the cleaning element about the paddle. The bodies are formed of an absorbent material for use as a drying element and with an intermediate fluid carrying layer and a rough mesh layer for use as a scrubbing element.

11 Claims, 4 Drawing Sheets

VEHICLE WINDOW CLEANING APPARATUS

BACKGROUND OF THE INVENTION

1. Field of the Invention:

The present invention relates, in general, to cleaning apparatus and more specifically, to apparatus for cleaning vehicle windows.

2. Description of the Art:

Various tools are available to clean the exterior surface of vehicle windows. Such tools typically include a handle and a perpendicularly oriented cleaning element, such as a wiper blade, sponge rubber pad and combinations thereof. Water or ammonia based cleaning fluid is applied to the exterior surface of the vehicle window and scraped off by the tools to remove debris. Such tools are easy to use on the exterior surface of vehicle windows since the exterior surface of the vehicle windows is easily accessible both to apply cleaning fluid to the windows and to remove the fluid and debris from the windows.

However, such tools are ineffective in cleaning the inner surface of vehicle windows. The extreme angles of the vehicle windshield and backlight with respect to the dashboard and rear seat shelf in conjunction with adjacent vehicle components, such as the rear view mirror, steering wheel and rear, center brake light housing make it difficult to get the edges of a cleaning tool close to the extreme lower edges of the windshield and backlight. In addition, applying fluid, which is typically in the form of a spray, to the inner surfaces of the windshield and backlight results in a significant amount of the spray being deposited on the underlying horizontal surfaces adjacent to the windows, such as the vehicle dashboard and the rear shelf.

Thus, the most common implements used to clean the inner surfaces of vehicle windows are sponges, rags and paper towels. Manual force is exerted through the user's hands to manually apply cleaning fluid and/or spray to the inner surface of the windows and then to manipulate the cleaning element in a back and forth or circular motion across the surface of the windows. While a user may be able with a considerable amount of effort to clean most of the inner surface of the vehicle window, it is still difficult to completely clean the edges of the window and, more importantly, the lower edges of a vehicle windshield and backlight.

A variety of tools have been devised specifically to clean the inner surfaces of vehicle windows. Such tools are typically formed of a pad which is connected to an elongated handle. A cleaning element is attached to one side of the pad by various means including clips, straps, or hook and pile fasteners. However, each of these tools is specifically devised for a single type of cleaning operation, such as scrubbing or drying, but not both.

While such tools improve the reach of the user and enable the user to clean the lower edges of vehicle windows, and in particular, the windshield and backlight, it is believed that further improvements can be made to such vehicle window cleaning apparatus to make the cleaning apparatus easier to use, to provide easily detachable and interchangeable mounting of different shaped pads or plates to the handle, as well as providing easy replacement of wet, soiled cleaning elements.

SUMMARY OF THE INVENTION

The present invention is a cleaning apparatus particularly suited for cleaning and drying the interior surfaces of vehicle windows.

In a preferred embodiment, the cleaning apparatus includes a substantially rigid paddle having first and second opposed surfaces. A handle is pivotally connected on one end to the second surface of the paddle. A cleaning element is removably affixed to the paddle. The cleaning element includes a first surface mountable in registry with one surface of the paddle and side edges disposed over a peripheral portion of the paddle. Elastic means are provided on the side edges of the cleaning element for elastically securing the cleaning element about the paddle.

Preferably, the cleaning element forms a cleaning system which includes at least two distinct cleaning elements, one a scrubbing element including a fluid saturable inner layer and, another, a drying body formed of an absorbent material. The ends of the side edges of the cleaning element are drawn inward by the elastic means to form an opening normally smaller than the periphery of the paddle.

Hinge means are cooperatively formed on one of the first and second surfaces of the paddle and the one end of the handle for pivotally connecting the paddle to the handle. Means are formed on the hinge means for biasing a pivot pin into a hinge receiver to detachably connect the paddle to the handle.

Preferably, the hinge means includes first and second pivot pins extending coaxially outward from opposed sides of the one end of the handle. First and second receivers are mounted on the paddle for receiving the first and second pivot pins, respectively. A spring biased means is carried on the handle for retractably biasing one of the first and second pivot pins outward from the handle.

An aperture is formed in the end of the handle opening to an interior chamber in the end of the handle. A slider carries one of the first and second pivot pins and is movably disposed within the interior chamber. A spring is engagable with the slider for normally biasing the slider to a position in which the one of the first and second pivot pins extends outward through the aperture in the end of the handle for releasible engagement in one of the first and second receivers. A projection extends from the slider through another opening in the handle to facilitate manual movement of the slider.

The cleaning apparatus of the present invention affords numerous advantages over prior cleaning apparatus devised for cleaning the interior surfaces of vehicle windows. The present cleaning apparatus enables a plurality of different shaped paddles and attached scrubbing and drying elements to be detachably mounted on the handle for use in practically any vehicle window cleaning application. The present cleaning apparatus enables a user, for example, to easily reach the lower edges of the interior surface of vehicle windows adjacent to the vehicle dash board or rear backlight despite the extreme angles of such windows with respect to interior vehicle surfaces and the adjacent rear view mirror, steering wheel or rear center brake light assembly housing. The different cleaning elements are easily attachable and removable from the paddle thereby minimizing the total time required for each cleaning operation as a scrubbing element and one or more drying elements can be quickly and easily mounted on a paddle.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
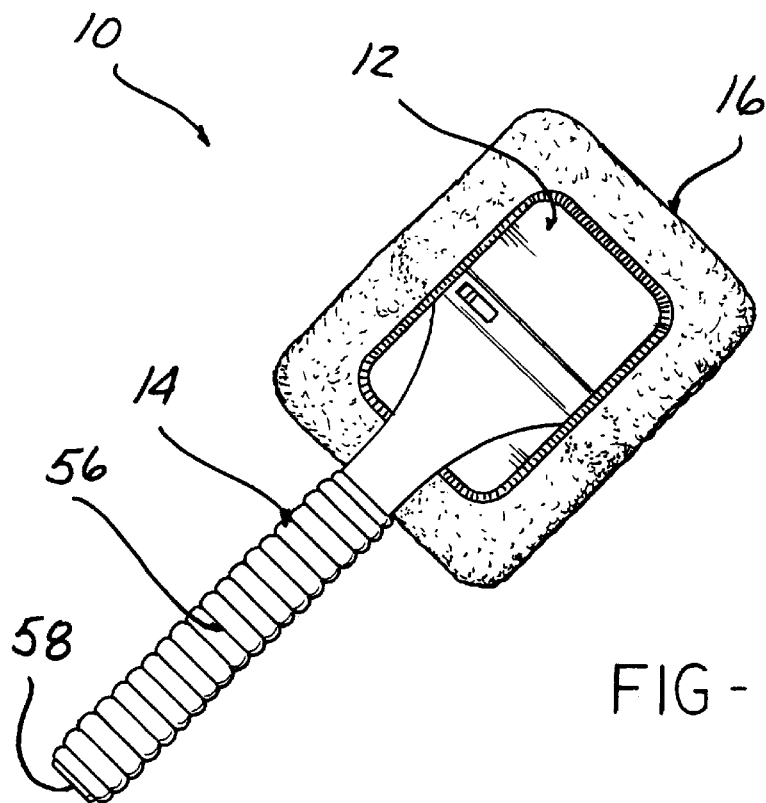
FIG. 1 is an assembled, perspective view of a first embodiment of a cleaning apparatus according to the present invention with a drying element mounted thereon.

Referring now to the drawing, and to FIGS. 1–5 in particular, there is depicted a first embodiment of a cleaning apparatus 10 constructed in accordance with the teachings of the present invention. It will be understood that although the following description of the use of the cleaning apparatus 10 in cleaning and drying the interior surfaces of vehicle windows, the cleaning apparatus 10 may also be applied in a variety of other cleaning applications, such as to clean and dry the exterior surface of the vehicle windows, house or building windows, mirrors, or practically any surface that requires the use of a cleaning fluid and its removable from the surface being cleaned.

In general, the cleaning apparatus 10, includes a paddle 12, a handle 14, and a drying element 16.

As shown in one embodiment in FIGS. 1–4, the paddle 12 is formed of a generally planar plate 20 having one of a number of different configurations or sizes. The plate 20 is preferably formed of a lightweight material, with a suitable plastic material being preferred. However, other materials, such as metal, wood, composites, etc., may also be employed.

The plate 20 has a generally rectangular or possibly square configuration with four exterior side edges each denoted by reference number 22. Rounded corners or radii are formed at the juncture of each of two side edges 22. The plate 20 is also formed with a first or rear surface 50 and a second, opposed, front surface 52.

The plate 20 may be provided in two different sizes, such as a small size and a large size. By example only, a small size plate 20 may have dimensions of 5"×7". The larger plate 20 may have dimensions of 7"×9". It will be understood that the plate 20 may also be formed with a square configuration of equal length side edges 22 and with other square or rectangular dimensions as needed for a particular cleaning application.

Figure 5:
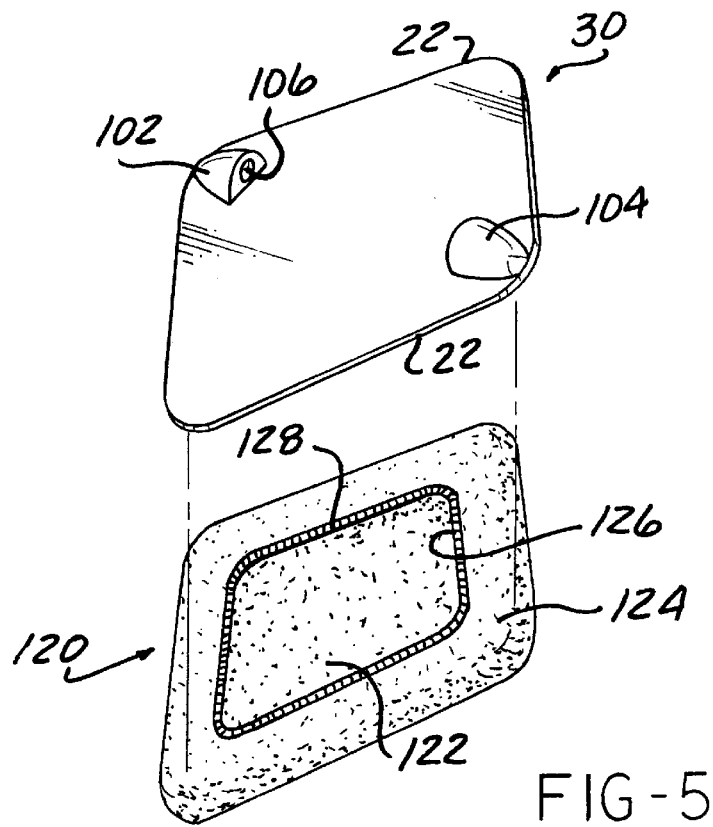
FIG. 5 is a perspective view of a second embodiment of a drying element and paddle.

The paddle 12 may also be formed in other configurations for drying different shaped windows or portions of a vehicle window. As shown in FIG. 5, a plate 30 has a general oval shape with maximum dimensions of 7"×9" for a large oval shaped plate 30 or 5"×7" for a smaller oval shaped plate 30. All of the exterior surface or side edges of the paddle 30 is smoothly curved without any sharp projections or corners.

Figure 6B:
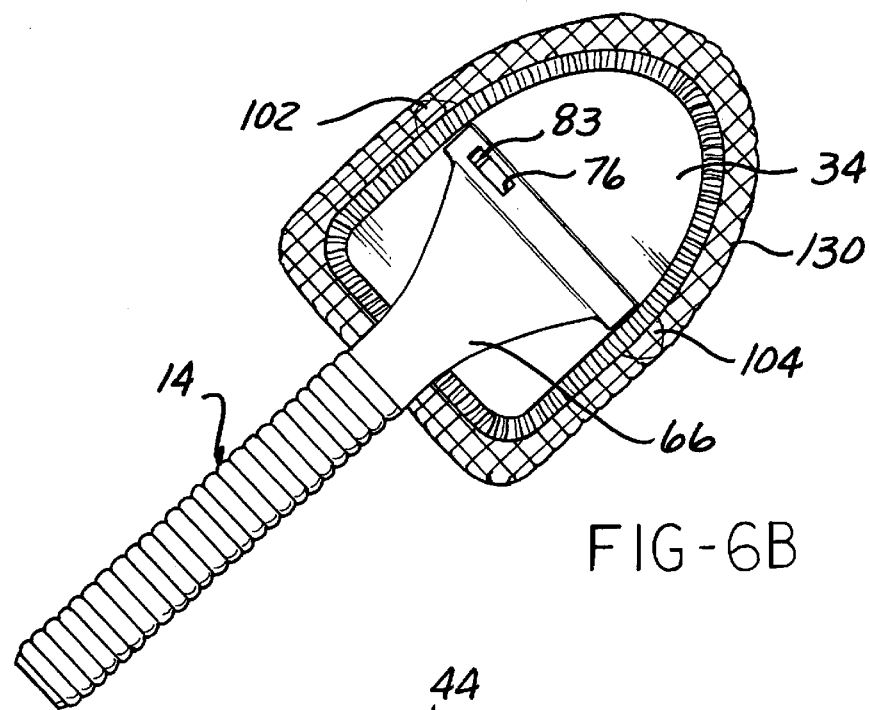
FIG. 6B is a perspective view of the assembled cleaning apparatus of FIG. 6A with the scrubbing element mounted thereon.
Figure 6A:
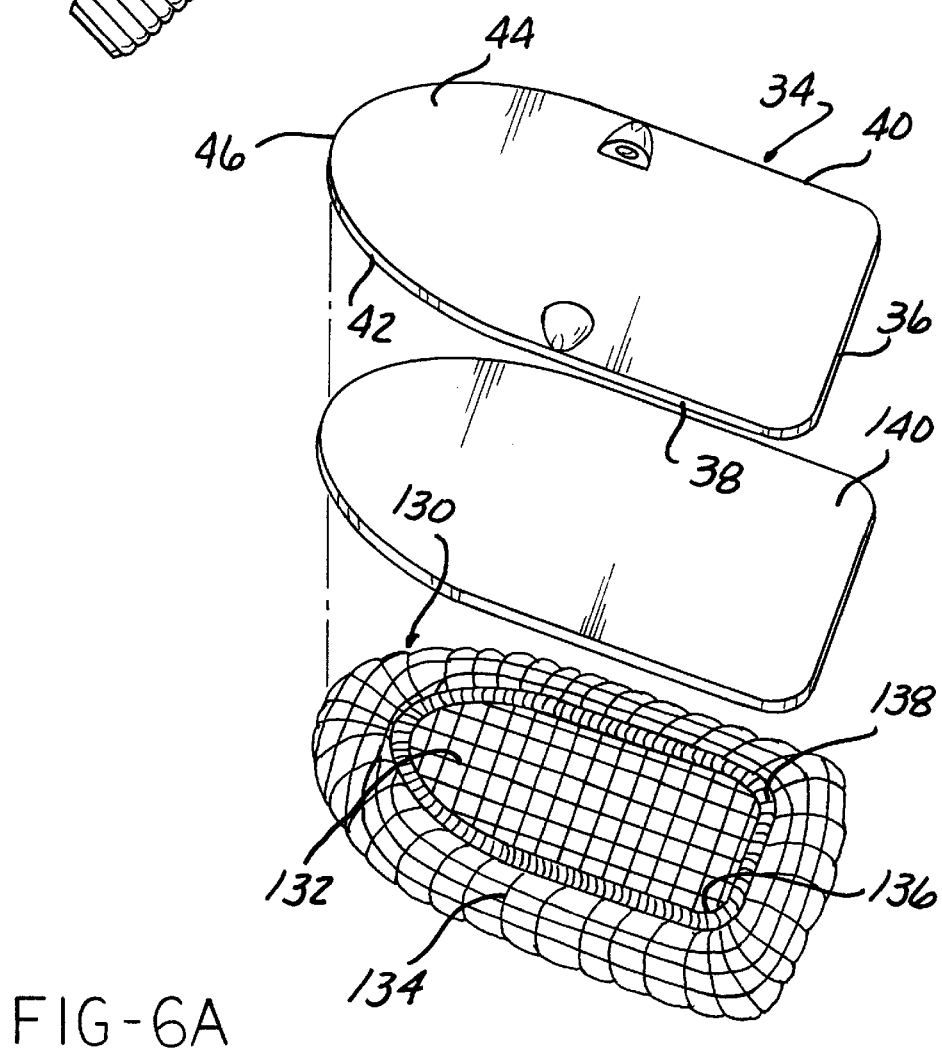
FIG. 6A is an exploded perspective view of a scrubbing element and paddle.

FIGS. 6A and 6B depict a plate 34 which may also be used to form the paddle 12 of a cleaning embodiment of the apparatus 10. In this embodiment, the plate 30 has a first flat side edge 36 which smoothly merges into two generally perpendicularly extending side edges 38 and 40. The side edges 38 and 40 have an end portion 42 and 44, respectively, which tapers inwardly toward each other thereby narrowing the width of the plate 34 at a second end 46 opposite from the side edge 36. The tapered portions 42 and 44 extend to a smoothly rounded apex or second end 46.

Figure 2:
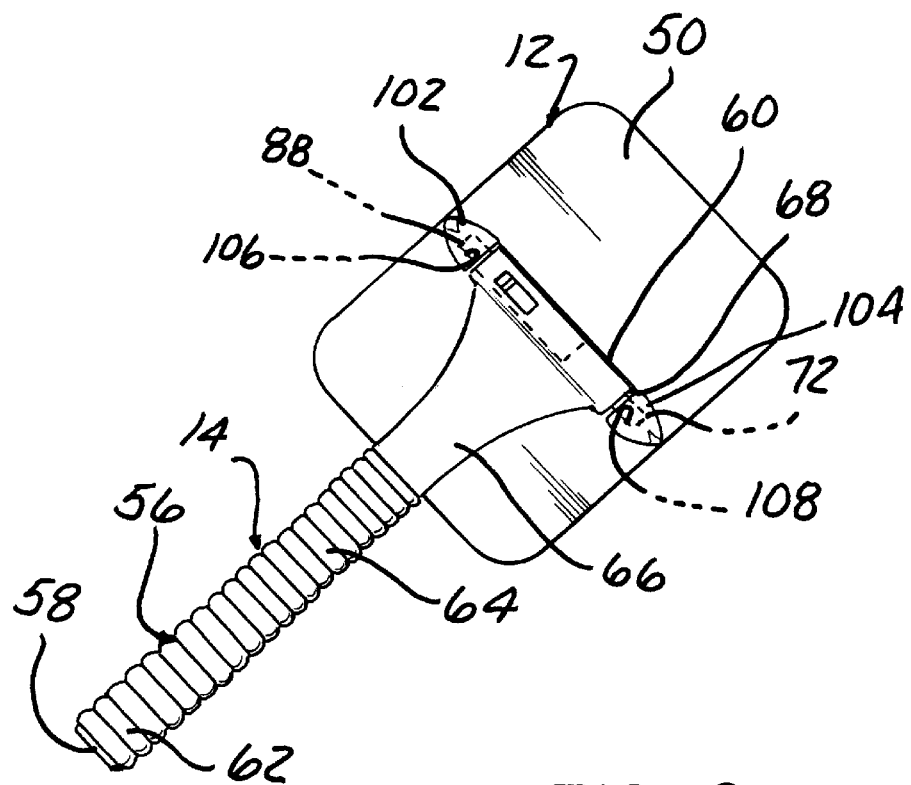
FIG. 2 is a perspective view of the handle and paddle of the cleaning apparatus shown in FIG. 1.

As shown in FIGS. 1 and 2, the paddle 12, regardless of its plate configuration 20, 30 or 34, may have a generally planar shape. A slight concave bend may also be formed in any of these plate 20, 30 or 34.

Figure 3:
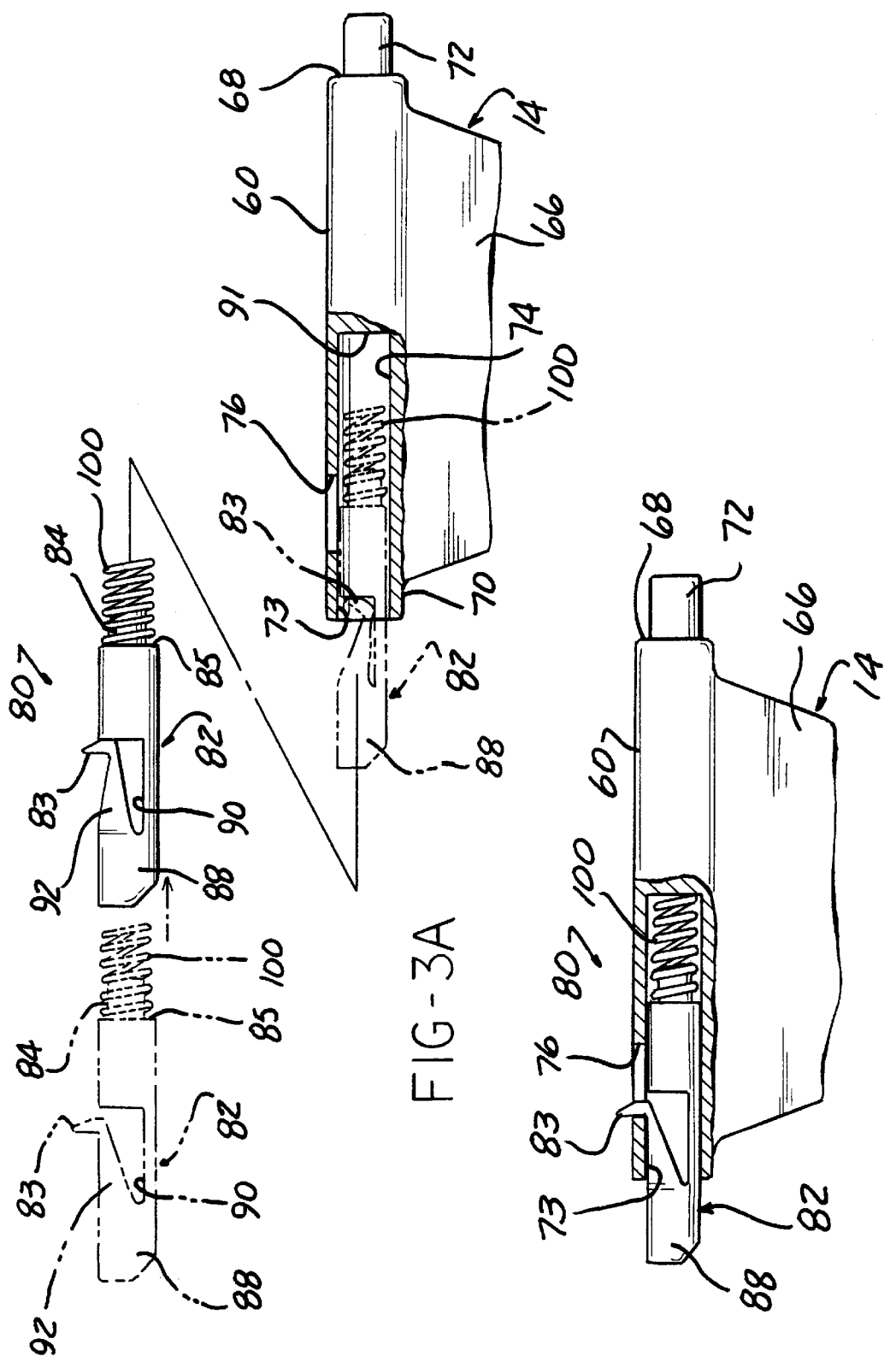
FIG. 3A is a sequential representation of the insertion of the spring biased pin into the handle shown in FIG. 1 and 2.
FIG. 3B is a partially broken-away, plan view of the spring biased pin in its assembled position in the handle.

Referring now to FIGS. 1–3, the handle 14 of the cleaning apparatus 10 may take one of a variety of different shapes to provide a convenient gripping surface even when wet. Thus, by example, the handle 14, shown in FIGS. 1 and 2, is formed of a lightweight material, such as a somewhat rigid, although flexible and slightly bendable plastic. The handle 14 is formed of an elongated member 56 of one of at least two distinct lengths and having a first end 58 and an opposed second end 60. The elongated member 56 extends generally planarly between the first and second ends 58 and 60. Although the member 56 may have a constant cross-section and a constant width dimension from end to end, in order to provide a more easily grippable surface 14, the member 56 is formed with a first enlargement 62 at the first end 58. The opposed side edges of the member 56 taper inwardly from the first enlargement 62 to a smaller width intermediate portion 64 before tapering outwardly to a second enlarged portion 66 adjacent the second end. At least a portion of the first enlargement 62 and the intermediate portion 64 of the member 56 may be formed with a rough or contoured exterior surface, such as a series of serrated, spaced ridges or projections as shown in FIGS. 1 and 2, to provide an easily grippable surface even when wet.

As shown in FIGS. 2 and 3, the side edges of the second enlarged portion 66 taper smoothly outward from the intermediate portion 64 and terminate in opposed first and second side edges 68 and 70, adjacent the second end 60 of the member 56.

The cleaning apparatus 10 also includes means for mounting any of the plates 20, 30 and 34, one at a time, to the handle 14. Preferably, the mounting means includes means for detachably mounting the plates 20, 30 and 34 to the handle 14. More preferably, means are provided for pivotally and detachably mounting the plates 20, 30 and 34 to the handle 14.

According to a preferred embodiment of the present invention shown more clearly in FIGS. 3A and 3B, the mounting means includes a pivot pin 72 mounted or unitarily formed on the first side edge 68 of the member 56. The opposite or second side edge 70 is formed with an aperture 73 which opens to an interior chamber 74 in the second enlarged portion 66 of the member 56 adjacent to the second end 60. An opening or cut out 76 in the exterior surface of the handle 14 communicates with the interior chamber 74.

A spring biased pin assembly 80 includes a slider 82 having a generally cylindrical cross section. The slider 82 is formed with a reduced diameter first end in the form of a circular sleeve 84. A shoulder 85 on the slider 82 form a seat for a biasing spring, such as a coil spring 100 which also engages one end of the interior chamber 74.

The opposed end of the slider 82 is formed as a pivot pin 88 having essentially the same shape as the pin 72 mounted on the side edge 68 of the handle 14. A notch or recess 90 is formed in the slider 82 adjacent to the pin 88 at one end of the slider 82. The recess 90 forms a resilient, movable arm 92 along one side of the slider 82. The free end of the arm 92 is formed in a projection or catch 83 which extends beyond the exterior surface of the adjacent portion of the slider 82 in a normal, biased position shown in FIG. 3A.

In assembling and mounting the spring biased pin assembly 80 as shown in FIGS. 3A and 3B, the spring 100 is mounted over the sleeve 84 on the slider 82. The spring biased pin assembly 80 is inserted spring first through the aperture 73 into interior chamber 74 in the handle member 56.

The arm 92 is depressed by the user toward the opposite side of the slider 82 to enable the outer end of the projection or catch 83 to be inserted through the aperture 73 in the handle 14. The end of the catch 83 is angled to aid in downward movement of the catch 83 upon engagement with the end 70.

Continued insertion forces are exerted on the end of the pin 88 of the slider 82 until the projection 83 passes the interior edge of the opening 76 in the enlarged end portion 66 of the handle 14. The resilient nature of the arm 92 enables the projection 83 to snap outward, as shown in FIG. 3B, to lock the spring biased pin assembly 80 within the interior chamber 74 of the handle 14 as shown in FIG. 3B. The spring 100 is compressed a slight amount to exert a spring force against the slider 82 to maintain the slider 82 in a position in which the projection 88 normally engages one edge of the opening 76 in the handle 14.

As shown in FIGS. 1 and 2, the pins 72 and 88 are co-axially aligned and form part of hinge means which are rotatably mountable in opposed hinge members 102 and 104 as shown in FIG. 1. Each of the hinge members or receivers 102 and 104 are preferably unitarily formed as part of the first or rear surface 50 of the paddle 12. Since the paddle 12 is preferably formed of a plastic, the hinge members 102 and 104 may be unitarily molded as part of the paddle 12.

Figure 4:
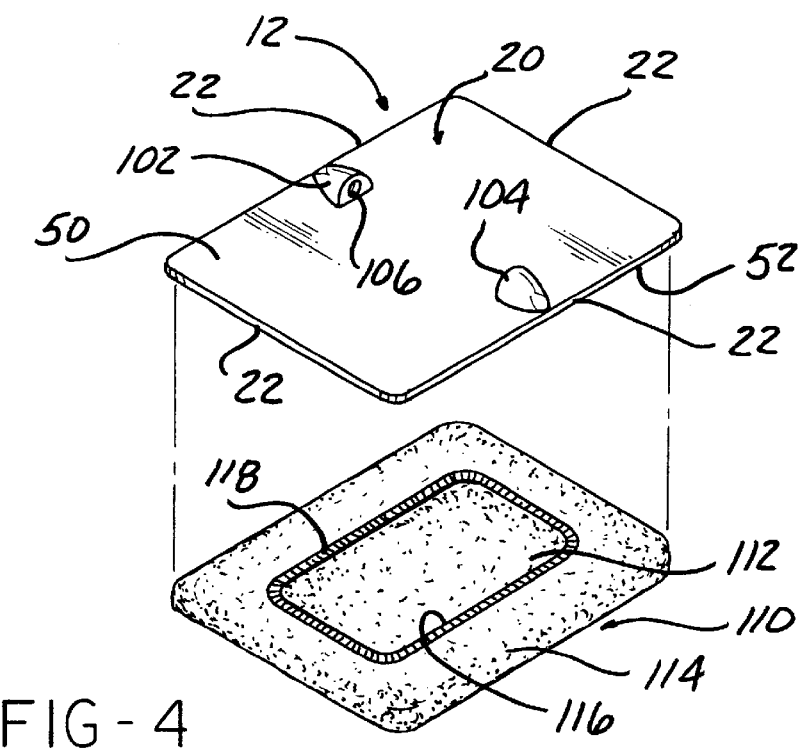
FIG. 4 is a perspective view of a first embodiment of a drying element and paddle.

Each of the hinge members 102 and 104 are in the form of solid bodies which are unitarily formed as part of the plate 20 and project upwardly from the first rear surface 50 of the plate 20. As shown in FIGS. 4 and 5, each of the hinge members 102 and 104 is formed with an inner face opposing the inner face of the opposed hinge member in a smoothly curved or arcuate shaped outer surface extending toward the adjacent side edge 22. Alternately, the hinge members 102 and 104 may be simple flanges projecting perpendicularly from the first rear surface 50 of the plate 20, with each flange having an aperture for receiving the pivot pins 72 and 88.

Thus, the internal bores 106 and 108, respectively, receive the pivot pins 88 and 72, respectively, on the handle 14 to pivotally couple the plates 20, 30 and 34 to the handle 14 and enable substantially 180° pivotal movement of the handle 14 relative to the plates 20, 30 and 34.

Each plate embodiment of the paddle 12 is coupled to the handle 14 by pushing the projection 83 on the slider 82 away from the adjacent side edge 70 of the handle member 56 to retract the end 88 of the slider 82 inwardly within the interior chamber 74 in the second enlarged portion 66 of the handle member 56 to enable the second side edge 70 to be disposed adjacent to the inner surface of the second hinge member 102, it being understood that the opposed pivot pin 72 has already been inserted into the bore 108 in the second hinge member 104. Release of the projection 83 allows the spring 100 to move the slider 82 away from the spring stop 90 and to urge the second pivot pin 88 outwardly through the aperture 73 in the second side edge 70 of the handle member 56 and into the bore 106 in the hinge member 102.

The projection or catch 83 is positioned along the length of the slider 82 from the second pivot pin end 88 to enable the pivot pin 88 to be completely retracted within the second end 70 of the handle 14 when the projection 83 engages the far end of the opening 76. Release of the moving force on the projection 83 enables the spring 100 to move the slider 82 in an opposite direction until an opposite edge of the projection 83 engages the edge of the opening 76 and the pivot pin 88 projects exteriorly of the second end 70 of the handle 14.

A first drying element embodiment of the cleaning element 16 which is removably mountable on the paddle 12 is shown in FIG. 4. In this embodiment, the drying element is in the form of a pliable body 110 sized to releasibly mount about the plate 20 of the first embodiment of the paddle 12. Thus, the body 110 has a first major surface 112 which is disposable adjacent a second front surface 52 of the plate 20, a continuous side edge 114 extending from the first major surface 112, and a peripheral edge 116 surrounding an open end opposite the first surface 112. The peripheral edge 116 may be stitched to prevent unravelling or separation of the fibers forming in the body 110. Preferably, the body 110 is formed of an absorbent material, such as cotton, etc.

Elastic means 118 in the form of an elastic band is stitched or otherwise attached to the peripheral edge 116 of the body 110 to provide an elastic force for closing the peripheral edge 116 to a small open diameter to thereby securely, yet releasibly mount the body 110 about the paddle 12. At the same time, the elastic means 118 allows the body 110 to be easily removed from the paddle 12 and replaced with a clean, dry body 110 when necessary.

It will be understood that the body 110 may be provided in different sizes to conform to the shape and size of the large or small plates 20 described above.

A second embodiment of a body 120 usable as the drying element is shown in FIG. 5 and includes a first major surface 122, a continuous side edge 124 and a peripheral edge 126. Elastic means 128 are secured to the peripheral edge 126. Preferably, the peripheral edge 126 and the adjacent side edge 124 are formed or cut to a generally oval shape to enable the body 120 to conform to the shape of the oval plate 30.

Yet another body 130, shown in FIGS. 6A and 6B, may be used as the cleaning element 16 for the plate 34. Like the other bodies 110 and 120, the body 130 is formed of a first, generally planar surface 132, a side edge 134 which terminates in continuous peripheral edge 136 surrounding an opening, and elastic means 138 secured to the peripheral edge 136. The peripheral edge 136 and the side edge 134 are preferably formed in the shape of the plate 34 to enable the body 130 to be removably mounted about and to conform to the shape of the plate 34. As shown in FIG. 6A, an absorbent layer or pad 140 of substantially the same shape as the plate 34 is interposed between a major surface of the plate 34 and the first major surface 132 of the body 130 to provide fluid absorbent features. The pad 140 can be loosely interposed between the plate 34 and the body 130 or fixed on the plate 34 by adhesive or other suitable means. The body 130, in this embodiment, is preferably formed of a mesh or rough material to act as a scrubbing surface in conjunction with a fluid filled absorbent layer 140 which dispenses fluid during the scrubbing operation. Thus, the body 130 and absorbent layer 140 function as a scrubbing element to apply cleaning fluid to a window and, with suitable scrubbing movement, to simultaneously loosen dirt and other debris from the window.

The various drying and cleaning bodies 110, 120 and 130 shown in FIGS. 4–6 may be used to perform a variety of cleaning or drying tasks. Any of the bodies 110 and 120 may be used merely as a dusting cloth to remove dust from a vehicle window or other interior vehicle surface. Further, the body 130 shown in FIG. 6 and its associated plate 34 with the rounded end 46 and interior absorbent layer 140 is ideally suited to act as a sponge and scrubbing surface in applying cleaning fluid or water to the interior surface of a vehicle window and scrubbing or removing debris stuck on a window.

Once the absorbent layer 140 is wetted with the cleaning fluid, the handle 14 of the cleaning apparatus 10 is grasped by one hand of the user and then moved adjacent to the window until the body 130, contacts the interior surface of the window. The cleaning element 10 is then moved in any motion, such as back and forth, sideways, circular or combinations thereof to apply the cleaning fluid to the entire interior surface of the window and to remove any debris stuck on the window. The body 130 and plate 34 are then removed from the handle 14 by simply reversing the insertion operation of the spring biased pin assembly 80 as described above to detach the plate 34 and the from the handle 14. Specifically, the user exerts a sliding force on the projection 83 to the right, in the orientation shown in FIG. 3B, urging the slider 82 against the force of the spring 100 until the pin 88 on the slider 82 disengages from the associated hinge 102. This enables the paddle 12 and the handle 14 to be separated from each other. One of the other bodies 110 or 120 and its associated plate 20 or 30, respectively, is then attached to the handle 14 as described above. The body 110 or 120 is then brought into engagement with the window and again moved in any fashion across the entire surface of the window to dry the previously applied cleaning fluid and remove any loose debris from the window.

If, at any time, the body 110 or 120 becomes saturated with cleaning fluid or accumulates a significant amount of dirt or other debris, the user may simply remove the body 110 or 120 from the associated paddle 12 and then mount a clean, dry body 110 or 120 on the paddle 12 to continue with the cleaning operation.

Thus, there has been disclosed a unique cleaning apparatus particularly suited for cleaning and drying the interior surfaces of vehicle windows which is easy to use, is capable of scrubbing and drying all of the interior surface of vehicle windows, including the lower edges adjacent the vehicle dash board and rear shelf, has easily detachably mounted paddles and scrubbing and drying elements enabling different shaped paddles and cleaning and drying elements to be easily attached to the handle for scrubbing and drying various portions of or different shaped windows as well as enabling the scrubbing and drying elements to be easily removed when wet or soiled and a new element applied to the paddle.

What is claimed is:

1. A cleaning apparatus comprising:
   a paddle having first and second opposed surfaces;
   a handle having first and second opposed ends, an aperture formed in the second end of the handle;
   hinge means, cooperatively formed on the first surface of the paddle and the second end of the handle, for pivotally connecting the paddle to the handle, the hinge means including:
   first and second pivot pins extending coaxially from opposite sides of the aperture in the second end of the handle;
   first and second receivers mounted on the first surface of the paddle, each of the first and second receivers being capable of receiving one of the first and second pivot pins; and
   biasing means retractably biasing one of the first and second pivot pins outward from the handle and into one of the first and second receivers, the biasing means including:
   a slider carrying one of the first and second pivot pins;
   a spring engagable with the slider for normally biasing the slider to a position in which the one of the first and second pins extends outward from the handle;
   a projection extending from the slider outward from the handle to facilitate movement of the slider within the handle in a direction to disengage the one of the first and second pins from one receiver;
   a recess formed adjacent an end of the slider carrying the one of the first and second pivot pins; and
   a resilient arm extending from the end of the slider carrying the one of the first and second pivot pins and normally extending outward from the recess the projection formed on a free end of the arm; and
   a cleaning element removably mountable over the paddle.

2. The cleaning apparatus of claim 1 wherein:
   the aperture in the end of the handle opens to an interior chamber in the handle, the slider movably disposed within the interior chamber.

3. The cleaning apparatus of claim 1 wherein the cleaning element comprises:
   a first surface mountable in registry with the second surface of the paddle and side edges disposed over the periphery of the second surface; and
   means, mounted on the side edges of the cleaning element, for elastically and removably securing the cleaning element about the paddle.

4. The cleaning apparatus of claim 3 wherein:
   the side edges of the cleaning element are drawn inward by the elastically securing means to form an opening normally smaller than the outer dimensions of the paddle.

5. The cleaning apparatus of claim 1 wherein the cleaning element is formed of a fluid absorbent material.

6. The apparatus of claim 1 wherein:
   the cleaning element is formed of a rough textured material to form a scrubbing element.

7. The apparatus of claim 6 wherein the rough textured material is an open mesh material.

8. The apparatus of claim 6 further comprising:
   a fluid absorbent material layer interposed between the paddle and the cleaning element for dispensing fluid through the cleaning element.

9. A vehicle window cleaning apparatus adapted for cleaning and driving the interior and exterior surfaces of vehicle windows, the apparatus comprising:
   a plurality of interchangeably usable paddles, each having a different peripheral shape, each paddle having first and second opposed surfaces;
   one handle pivotally connectable to the first surface of the paddles;
   connecting means, cooperatively formed on the first surface of each of the paddles and the handle for releasably pivotally connecting the handle to one of the paddles;
   a plurality of cleaning elements, each removably attachable one at a time to one of the paddles; and
   at least one of the cleaning elements having elastic means forming side edges of the cleaning element into a closed opening normally smaller than the outer dimensions of each of the paddles;

at least one of the cleaning elements formed of a rough textured material to form a scrubbing element;

the connecting means including:
    first and second pivot pins extending coaxially from opposite sides of the handle;
    first and second receivers mounted on the paddle, each of the first and second receivers being capable of receiving one of the first and second pivot pins; and
    biasing means carried in the handle and retractably biasing one of the first and second pivot pins outward from the handle and into one of the first and second receivers.

10. The apparatus of claim 9 further comprising:

an aperture formed in the handle;

the biasing means including:
    a slider carrying one of the first and second pivot pins;
    a spring engagable with the slider for normally biasing the slider to a position in which the one of the first and second pins extends outward from the handle; and
    a projection extending from the slider outward from the handle to facilitate movement of the slider within the handle in a direction to disengage the one of the first and second pins from one receiver.

11. The apparatus of claim 10 wherein the slider comprises:

a recess formed adjacent an end of the slider carrying the one of the first and second pivot pins; and a resilient arm extending from the end of the slider carrying the one of the first and second pivot pins and normally extending outward from the recess, the projection formed on a free end of the arm.

\* \* \* \* \*